(12) United States Patent
Moon et al.

(10) Patent No.: US 10,209,790 B2
(45) Date of Patent: Feb. 19, 2019

(54) REMOTE CONTROL APPARATUS AND CONTROL METHOD THEREFOR

(71) Applicant: SAMSUNG ELECTRONICS CO., LTD., Suwon-si, Gyeonggi-do (KR)

(72) Inventors: Jong-bo Moon, Suwon-si (KR); Yong-deok Kim, Anyang-si (KR); Hyun-kyu Yun, Seoul (KR); Do-sung Jung, Seoul (KR); Je-sun Hwang, Bucheon-si (KR); Min-sup Kim, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 3 days.

(21) Appl. No.: 15/109,536

(22) PCT Filed: Dec. 29, 2014

(86) PCT No.: PCT/KR2014/012944
§ 371 (c)(1),
(2) Date: Jul. 1, 2016

(87) PCT Pub. No.: WO2015/102324
PCT Pub. Date: Jul. 9, 2015

(65) Prior Publication Data
US 2016/0328031 A1  Nov. 10, 2016

(30) Foreign Application Priority Data
Jan. 3, 2014  (KR) .................. 10-2014-0000938

(51) Int. Cl.
*G06F 3/038* (2013.01)
*H04N 21/422* (2011.01)
(Continued)

(52) U.S. Cl.
CPC .............. *G06F 3/0383* (2013.01); *G06F 3/01* (2013.01); *G06F 3/0346* (2013.01);
(Continued)

(58) Field of Classification Search
CPC ..... H04N 2005/4428; H04N 2005/443; H04N 21/42222; H04N 21/42224; H04N 5/4403
See application file for complete search history.

(56) References Cited

U.S. PATENT DOCUMENTS 8,838,857 B2   9/2014 Yang et al.
2009/0141184 A1* 6/2009 Gulati ................ H04N 5/144
348/734

(Continued)

FOREIGN PATENT DOCUMENTS

CN  102084322  6/2011
CN  105830455  8/2016
(Continued)

OTHER PUBLICATIONS

International Search Report for PCT/KR2014/012944, dated Mar. 25, 2015, 4 pages.
(Continued)

*Primary Examiner* — Patrick N Edouard
*Assistant Examiner* — Peijie Shen
(74) *Attorney, Agent, or Firm* — Nixon & Vanderhye, P.C.

(57) ABSTRACT

A remote control apparatus is disclosed. The remote control apparatus includes: a motion detecting sensor for detecting a motion on the remote control apparatus; a touch sensor for detecting a touch input on the remote control apparatus; and a controller for controlling an external apparatus by selectively using a sensing value of the touch sensor and a sensing
(Continued)

value of the motion detecting sensor according to whether the touch input corresponds to a touch input for controlling the external apparatus.

11 Claims, 10 Drawing Sheets

(51) Int. Cl.
    *H04N 5/44*         (2011.01)
    *G06F 3/0346*     (2013.01)
    *G06F 3/0354*     (2013.01)
    *G06F 3/01*         (2006.01)
    *H04Q 9/00*        (2006.01)

(52) U.S. Cl.
    CPC ....... *G06F 3/03547* (2013.01); *H04N 5/4403* (2013.01); *H04N 21/42222* (2013.01); *H04N 21/42224* (2013.01); *H04Q 9/00* (2013.01); *G08C 2201/32* (2013.01); *H04N 2005/443* (2013.01); *H04N 2005/4428* (2013.01)

(56) References Cited

U.S. PATENT DOCUMENTS

| | | | | |
|---|---|---|---|---|
| 2009/0243909 | A1* | 10/2009 | Reams | G06F 1/3203 341/173 |
| 2009/0262074 | A1* | 10/2009 | Nasiri | A63F 13/06 345/158 |
| 2010/0039382 | A1* | 2/2010 | Kumagai | G06F 3/0346 345/158 |
| 2010/0134308 | A1* | 6/2010 | Barnardo | G06F 1/3203 340/670 |
| 2011/0037851 | A1* | 2/2011 | Kim | G06F 3/04847 348/143 |
| 2011/0122062 | A1* | 5/2011 | Chung | G06F 3/0346 345/158 |
| 2011/0134030 | A1 | 6/2011 | Cho | |
| 2011/0230228 | A1* | 9/2011 | Young | G08C 17/02 455/550.1 |
| 2011/0304648 | A1* | 12/2011 | Kim | G06F 1/1626 345/633 |
| 2012/0032901 | A1* | 2/2012 | Kwon | G06F 3/04883 345/173 |
| 2012/0144076 | A1* | 6/2012 | Yang | G06F 3/0346 710/63 |
| 2013/0127731 | A1 | 5/2013 | Song et al. | |
| 2013/0271404 | A1* | 10/2013 | Choi | G06F 3/01 345/173 |
| 2013/0321309 | A1* | 12/2013 | Tokutake | G06F 3/0488 345/173 |
| 2013/0342456 | A1* | 12/2013 | Choi | G06F 3/017 345/158 |
| 2016/0328031 | A1 | 11/2016 | Moon et al. | |

FOREIGN PATENT DOCUMENTS

| | | |
|---|---|---|
| EP | 2 040 465 | 3/2009 |
| EP | 2 320 304 | 5/2011 |
| EP | 2 667 281 | 11/2013 |
| EP | 3 051 827 | 8/2018 |
| KR | 10-2011-0062296 | 6/2011 |
| KR | 10-2012-0061711 | 6/2012 |
| KR | 10-2013-0054759 | 5/2013 |
| KR | 10-2013-0103905 | 9/2013 |
| KR | 10-2013-0142824 | 12/2013 |
| WO | 2015/102324 | 7/2015 |

OTHER PUBLICATIONS

Written Opinion of the ISA for PCT/KR2014/012944 with translation, dated Mar. 25, 2015, 9 pages.
Extended Search Report dated Sep. 13, 2017 in counterpart European Patent Application No. 14876618.1.
Office Action dated Aug. 28, 2018 in counterpart Chinese Patent Application No. 201480068411.2 and English-language translation thereof.

* cited by examiner

REMOTE CONTROL APPARATUS AND CONTROL METHOD THEREFOR

This application is the U.S. national phase of International Application No. PCT/KR2014/012944 filed 29 Dec. 2014, which designated the U.S. and claims priority to KR Patent Application No. 10-2014-0000938 filed 3 Jan. 2014, the entire contents of each of which are hereby incorporated by reference.

TECHNICAL FIELD

Apparatuses and methods consistent with the present disclosure relate to a remote control apparatus and a control method therefor, and more particularly, to a remote control apparatus and a control method therefor capable of controlling an electronic apparatus.

BACKGROUND AND SUMMARY

In recent years, with the development of electronic technology, an electronic apparatus may provide various functions to a user. For example, a television (TV) used in a home may provide broadcasting to a user and also various functions such as Internet access and game execution to a user.

In this case, the user may manipulate a remote controller in various ways to use a function of an electronic apparatus. For example, the user may touch a touch panel provided in the remote controller or move the remote controller horizontally to perform a specific function of the electronic apparatus.

For this purpose, the remote controller includes various kinds of sensors to detect a user command. In this case, however, the remote controller may consume a large current depending on a kind and the number of sensors and an error may occur in that different types of sensors simultaneously detect user commands input in different manners.

The present disclosure provides a remote control apparatus and a control method therefor capable of selectively using a sensing value of a touch sensor and a sensing value of a motion detecting sensor based on a touch input.

According to an aspect of the present disclosure, a remote control apparatus includes: a motion detecting sensor for detecting aspects of motion of the remote control apparatus; a touch sensor for detecting a touch input to the remote control apparatus; and a controller for controlling an external apparatus by selectively using a sensing value of the touch sensor and a sensing value of the motion detecting sensor, according to whether the touch input corresponds to a touch input for controlling the external apparatus.

When the touch input is detected, the controller may turn on the motion detecting sensor that is turned off.

When the touch input corresponds to a touch input for controlling the external apparatus, the controller may use the sensing value of the touch sensor to control the external apparatus.

When the touch input does not correspond to a touch input for controlling the external apparatus, the controller may use the sensing value of the motion detecting sensor to control the external apparatus.

The controller may compensate for the motion of the remote control apparatus before the motion detecting sensor is turned on based on a detected sensing value after a timing when the motion detecting sensor is turned on and may control the external apparatus based on the compensated value.

When the touch input for controlling the external apparatus is detected in a state in which the sensing value of the motion detecting sensor is used to control the external apparatus, the controller may use the sensing value of the touch sensor to control the external apparatus.

The motion detecting sensor may be, for example, a 6-axis sensor.

According to another aspect of the present disclosure, a control method for a remote control apparatus including a motion detecting sensor and a touch sensor to control an external apparatus includes: detecting a touch input; and controlling the external apparatus by selectively using a sensing value of the touch sensor and a sensing value of the motion detecting sensor, according to whether the detected touch input corresponds to a touch input for controlling the external apparatus.

In the controlling, when the touch input is detected, the motion detecting sensor that is turned off may be turned on.

In the controlling, when the touch input corresponds to a touch input for controlling the external apparatus, the external apparatus may be controlled by using a sensing value of the touch sensor.

In the controlling, when the touch input does not correspond to a touch input for controlling the external apparatus, the external apparatus may be controlled by using a sensing value of the motion detecting sensor.

In the controlling, the motion of the remote control apparatus before the motion detecting sensor is turned on may be compensated based on a detected sensing value after a timing when the motion detecting sensor is turned on and the external apparatus may be controlled based on the compensated value.

In the controlling, when the touch input for controlling the external apparatus is detected in a state in which the sensing value of the motion detecting sensor is used to control the external apparatus, the external apparatus may be controlled based on the sensing value of the touch sensor.

The motion detecting sensor may be, for example, a 6-axis sensor.

According to the example embodiments of the present disclosure, the sensing value of the touch sensor and the sensing value of the motion detecting sensor may be selectively used depending on the user's touch intention on the remote control apparatus.

Therefore, it is possible to reduce unnecessary power consumption and minimize malfunction by not using the sensing value detected by the motion detecting sensor even when the remote control apparatus moves upon the touch input.

DETAILED DESCRIPTION OF EXAMPLE EMBODIMENTS

Hereinafter, example embodiments of the present disclosure will be described in more detail with reference to the accompanying drawings.

Figure 1:
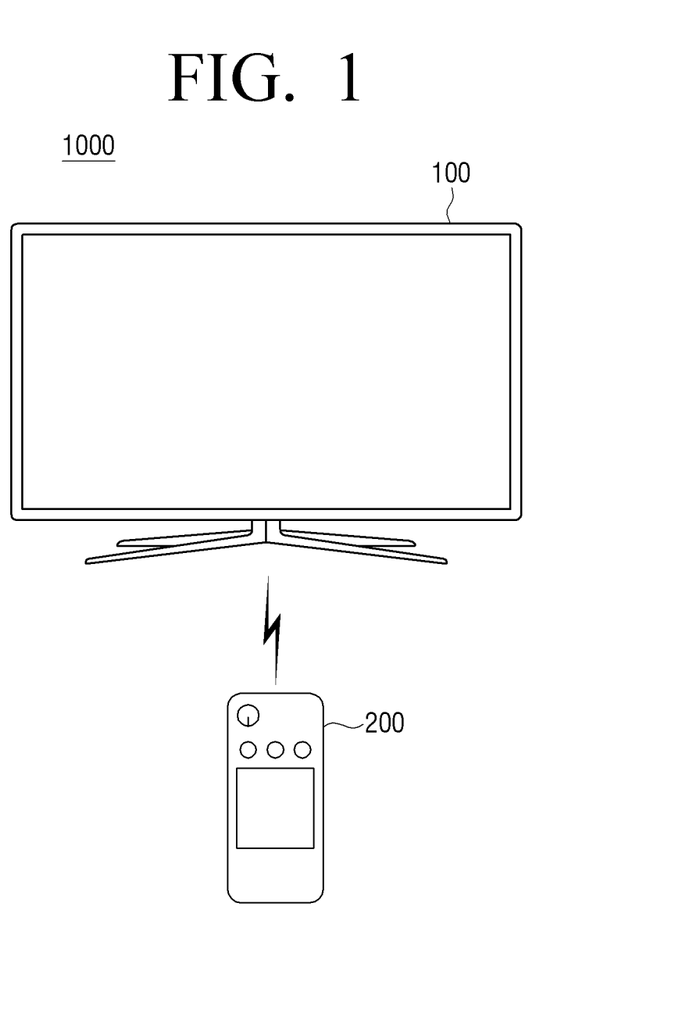
FIG. 1 is a diagram for describing a remote control system according to an example embodiment of the present disclosure.

FIG. 1 is a diagram for describing a remote control system according to an example embodiment of the present disclosure. Referring to FIG. 1, a remote control system 1000 may be configured to include an electronic device 100 and a remote control apparatus 200.

The electronic apparatus 100 may be implemented as various types of devices and may perform various operations depending on a signal received from the remote control apparatus 200.

For example, as illustrated in FIG. 1, the electronic apparatus 100 is implemented as a TV that performs a channel change, volume control, etc., based on the signal received from the remote control apparatus 200 or moves a cursor (or highlight) displayed on a screen and performs a function based on a menu option selected by the cursor.

The remote control apparatus 200 may control an external apparatus, that is, the electronic apparatus 100, based on a user command. In this case, the remote control apparatus 200 may be implemented as remote controller, or may be implemented as a terminal apparatus, such as a smart phone or a tablet in which applications performing a remote controller function are installed.

For this purpose, the remote control apparatus 200 may transmit a signal corresponding to a user command to the electronic apparatus 100.

In detail, the remote control apparatus 200 may detect a touch input and generate a signal corresponding to the detected touch input and transmit the generated signal to the electronic apparatus 100.

For example, the remote control apparatus 200 may generate a signal corresponding to a flick in a left or right direction when the flick in a left or right direction is input and transmit the signal to the electronic apparatus 100. In this case, the electronic apparatus 100 may perform a channel change function depending on a flick signal in a left or right direction which is received from the remote control apparatus 200.

Further, the remote control apparatus 200 may detect motion of the remote control apparatus 200 and may generate a signal corresponding to the detected motion and transmit the generated signal to the electronic apparatus 100.

For example, the remote control apparatus 200 may generate a signal corresponding to a motion in a left direction when the remote control apparatus 200 is moved to the left and transmit the generated signal to the electronic apparatus 100. In this case, the electronic apparatus 100 may move a cursor displayed on a screen to the left depending on the motion signal in the left direction which is received from the remote control apparatus 200.

As such, the remote control apparatus 200 may detect the touch input and the motion and control the electronic apparatus 100 based thereon. For this purpose, the remote control apparatus 200 may include a touch sensor for detecting a touch input and a motion detecting sensor for detecting a motion.

In this case, the remote control apparatus 200 may selectively use a sensing value of the touch sensor and a sensing value of the motion detecting sensor to control the electronic apparatus 100.

A method for selectively using a sensing value detected by a touch sensor and a sensing value detected by a motion detecting sensor will be described in more detail with reference to the accompanying drawings.

Figure 2:
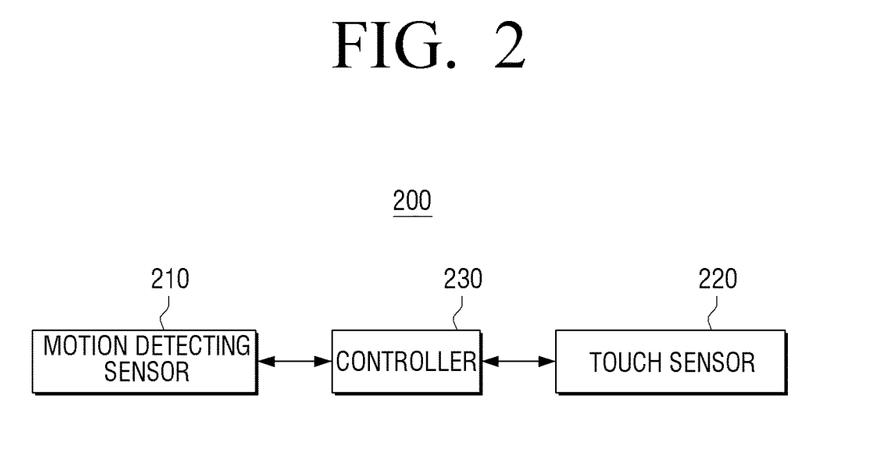
FIG. 2 is a block diagram for describing a configuration of a remote control apparatus according to an example embodiment of the present disclosure.

FIG. 2 is a block diagram for describing a configuration of a remote control apparatus according to an example embodiment of the present disclosure. Referring to FIG. 2, the remote control apparatus 200 includes a motion detecting sensor 210, a touch sensor 220, and a controller 230.

The motion detecting sensor 210 detects motion of the remote control apparatus 200. In detail, the motion detecting sensor 210 may detect aspects of the motion of the remote control apparatus 200 and may generate a signal corresponding to the detected motion and transmit the generated signal to the controller 230. That is, the motion detecting sensor 210 may detect the motion of the remote control apparatus 200 and transmit the sensing value on the basis thereof to the controller 230.

For this purpose, the motion detecting sensor 210 may be implemented as a 6-axis sensor. Here, the 6-axis sensor may be configured as a 3-axis gyro sensor and a 3-axis acceleration sensor (accelerometer) to detect aspects of motions such as movement, rotation, etc., of the remote control apparatus 200 and generate a signal corresponding to the detected motion.

Meanwhile, the foregoing example describes that the 6-axis sensor is configured as a 3-axis gyro sensor and a 3-axis acceleration sensor, but this is only an example. Therefore, the 6-axis sensor may be configured as a 3-axis geomagnetic sensor and a 3-axis acceleration sensor or may also be configured as a 3-axis geomagnetic sensor and a 3-axis gyro sensor.

Further, the foregoing example describes that the motion detecting sensor 210 is implemented as a 6-axis sensor, but this is only an example. That is, the motion detecting sensor 210 may be implemented as various types of sensors such as a 7-axis sensor, a 5-axis sensor, a 4-axis sensor, and the like, as well as a 6-axis sensor. In this case, each type of sensor may be implemented as a combination of at least two of a geomagnetic sensor, a gyro sensor, and an acceleration sensor for detecting aspects of motion along various axes. For example, the 5-axis sensor may be configured as a 2-axis gyro sensor and a 3-axis acceleration sensor.

As such, as long as the sensor can detect aspects of motion such as the movement, the rotation, etc., of the remote control apparatus 200, the type of sensor used for the 6-axis sensor may be variously changed and therefore the sensor may be implemented as various types of sensors in addition to the 6-axis sensor.

The touch sensor 220 detects a touch input on the remote control apparatus 200. In detail, the touch sensor 220 may be implemented as a touch panel, a touch screen, etc., to detect the touch input to generate a signal corresponding to the detected touch input and transmit the generated signal to the controller 230. That is, the touch sensor 220 may detect the touch input and transmit a sensing value on the basis thereof to the controller 230.

The controller 230 controls the overall operation of the remote control apparatus 200. For this purpose, the controller 230 may include a microcomputer (micom) (or central processing unit (CPU)) and a random access memory (RAM) and a read only memory (ROM) for an operation of the remote control apparatus 200. In this case, these modules may also be implemented in a system on chip (SoC) form.

In detail, the controller 230 may control the external apparatus 100 by selectively using a sensing value of the touch sensor 220 and a sensing value of the motion detecting sensor 210 according to whether the touch input detected by the touch sensor 220 corresponds to a touch input for controlling the external apparatus 100 (FIG. 1).

For this purpose, when the touch input is detected, the controller 230 may turn on the motion detecting sensor 210 if the motion detecting sensor is turned off.

That is, the controller 230 may cut off power supplied to the motion detecting sensor 210 at a time before the touch sensor 220 detects the touch input and if the touch input is detected, may supply power to the motion detecting sensor 210 to turn on the motion detecting sensor 210 that is turned off.

Here, detecting the touch input means that a touch for any region on the touch panel or the touch screen is detected, independent of a touch position, touch time, etc. In this case, the controller 230 may turn on the motion detecting sensor 210 at a timing when the touch is detected.

For example, assume that a user inputs a flick to the touch panel. Here, the flick corresponds to an operation of releasing a touch ("touch off") after the user moves the touch position beyond a preset threshold distance (or preset threshold speed). In this case, if any region on the touch panel is touched and the touch position moves a preset threshold distance or more, the controller 230 may supply power to the motion detecting sensor 210 at the touched timing to turn on the motion detecting sensor 210.

As another example, assume that a user inputs a tap to the touch panel. Here, the tap corresponds to the operation of releasing a touch ("touch-off") without movement of the touch position after the user inputs the touch ("touch-on"). In this case, if any region on the touch panel is touched, independent of the touch position, the controller 230 may supply power to the motion detecting sensor 210 at the touched timing to turn on the motion detecting sensor 210.

Meanwhile, the controller 230 may turn on the touch sensor 220 for detecting the touch input. For example, when a specific button provided on the remote control apparatus 200 is selected or even when the separate user command is not input to supply power to the touch sensor 220, the controller 230 may turn on the touch sensor 220, thereby enabling detecting of the touch input using the touch sensor 220.

Next, the controller 230 determines whether the touch input corresponds to a touch input for controlling the external apparatus 100. For this purpose, the remote control apparatus 200 may pre-store information about touch inputs for controlling the external apparatus 100.

Therefore, the controller 230 may determine whether the detected touch input corresponds to a touch input for controlling the external apparatus 100 based on the information about the pre-stored touch input.

Here, controlling the external apparatus 100 may mean controlling the operation of the external apparatus 100.

For example, assume that the flick changes the channel provided by the external apparatus 100 depending on the direction in which the flick is performed or corresponds to a touch input for controlling a volume.

In this case, the controller 230 may determine that the corresponding touch input corresponds to the touch input for changing the channel provided by the external apparatus 100 if the flick in the left or right direction is input. Further, if the touch input other than the flick in the left or right direction, for example, the touch input in which the touch position is moved in the left or right direction under the preset threshold distance (or preset threshold speed) is input, the controller 230 may determine that the corresponding touch input does not correspond to a touch input for controlling the external apparatus 100.

Further, the controller 230 may determine that the corresponding touch input corresponds to a touch input for controlling the volume of the external apparatus 100 if a flick in an up or down direction is input. Further, if the touch input other than the flick in the up or down direction, for example, the touch input in which the touch position is moved in the up or down direction under the preset threshold distance (or preset threshold speed) is input, the controller 230 may determine that the corresponding touch input does not correspond to a touch input for controlling the external apparatus 100.

As another example, assume that the tap for an item displayed on the touch screen corresponds to a touch input for performing the function corresponding to the corresponding item. Here, the item may be an item to which the functions of controlling the operation of the external apparatus 100 such as changing the channel provided by the external apparatus 100 and controlling the volume are mapped.

In this case, if a tap for a channel change item or a volume control item is input, the controller 230 may determine that the corresponding touch input corresponds to a touch input for changing the channel provided by the external apparatus 100 or controlling the volume. Further, if a tap for a region other than the item, for example, the background screen is input, the controller 230 may determine that the corresponding touch input does not correspond to a touch input for controlling the external apparatus 100.

Therefore, if the touch input corresponds to a touch input for controlling the external apparatus 100, the controller 230 may use a sensing value of the touch sensor 220 to control the external apparatus 100.

In detail, the controller 230 may perform control so that the signal corresponding to the touch input is transmitted to the external apparatus 100, such that the external apparatus 100 may perform the function corresponding to the touch input.

For example, if the flick is detected, the controller 230 may perform control to generate the signal corresponding to the direction in which the flick is performed and transmit the generated signal to the external apparatus 100. In this case, the external apparatus 100 may perform channel change or volume control depending on the signal received from the remote control apparatus 200.

As another example, if a tap for the channel change item or the volume control item displayed on the touch screen is detected, the controller 230 may perform control to generate the signal corresponding thereto and transmit the generated signal to the external apparatus 100. In this case, the external apparatus 100 may perform channel change or volume control depending on the signal received from the remote control apparatus 200.

In this case, the controller 230 may disregard the sensing value of the motion detecting sensor 210.

That is, even when the user touches the remote control apparatus 200 for controlling the external apparatus 100 by the touch input, the remote control apparatus 200 may move depending on the strength of the touch input, etc. In this case, the motion of the remote control apparatus 200 may be detected by the motion detecting sensor 210.

However, since the user's intention in touching the remote control apparatus 200 is to control the external apparatus 100 by touch input, if the external apparatus 100 is controlled by the sensing value of the motion detecting sensor 210, the external apparatus 100 may be operated differently from the user's intention.

Therefore, if the touch input corresponds to a touch input for controlling the external apparatus 100, the controller 230 determines that the user intends to control the external apparatus 100 by the touch input and thus disregards the sensing value of the motion detecting sensor 210 and uses only the sensing value of the touch sensor 220, thereby controlling the external apparatus 100.

Meanwhile, if the touch input does not correspond to a touch input for controlling the external apparatus 100, the controller 230 may use the sensing value of the motion detecting sensor 210 to control the external apparatus 100.

That is, if the touch input does not correspond to a touch input for controlling the external apparatus 100 and the touch input is continuously maintained, the controller 230 may use the sensing value of the motion detecting sensor 210 to control the external apparatus 100.

In this case, the controller 230 determines whether the motion of the remote control apparatus 200 detected by the motion detecting sensor 210 corresponds to a motion for controlling the external apparatus 100. For this purpose, the remote control apparatus 200 may pre-store the information about motions of the remote control apparatus 200 for controlling the external apparatus 100.

Therefore, the controller 230 may determine whether the detected motion of the remote control apparatus 200 corresponds to motion for controlling the external apparatus 100 based on the information about the pre-stored motion.

For example, assume that the motion of the remote control apparatus 200 moved in a predetermined direction beyond a preset threshold distance corresponds to a motion for moving a cursor displayed on the screen of the external apparatus 100.

In this case, if the sensing value of the 6-axis sensor is accumulated and the accumulated sensing value is a preset positive number or more (or if the accumulated sensing value is a preset negative number or less), the controller 230 may determine that the corresponding motion corresponds to motion for moving the cursor displayed on the screen of the external apparatus 100. Further, if the accumulated sensing value of the 6-axis sensor is under the preset positive number, the controller 230 may determine that the corresponding motion does not correspond to motion for controlling the external apparatus 100.

Therefore, if the detected motion of the remote control apparatus 200 corresponds to motion for controlling the external apparatus 100, the controller 230 may use the sensing value of the motion detecting sensor 210 to control the external apparatus 100.

In detail, the controller 230 may control the signal corresponding to the motion of the remote control apparatus 200 to be transmitted to the external apparatus 100, such that the external apparatus 100 may perform the function corresponding to the motion of the remote control apparatus 200.

For example, if motion of the remote control apparatus 200 beyond the preset threshold distance in the right direction is detected, the controller 230 may generate a signal corresponding to the motion in the right direction to be transmitted to the external apparatus 100. In this case, the external apparatus 100 may move the cursor displayed on a screen to the right depending on the signal received from the remote control apparatus 200.

As such, if the user touches the remote control apparatus 200, but the detected touch input is not a touch input for controlling the external apparatus 100, it may be considered that the user intends to move the remote control apparatus 200 to control the external apparatus 100.

Therefore, if a touch input is detected, but the detected touch input does not correspond to a touch input for controlling the external apparatus 100 and the touch state is maintained, the controller 230 may disregard the sensing value of the touch sensor 220 and use only the sensing value of the motion detecting sensor 210 to control the external apparatus 100.

However, if a touch input for controlling the external apparatus 100 is detected in a state in which the sensing value of the motion detecting sensor 210 for controlling the external apparatus 100 is used, the controller 230 may use the sensing value of the touch sensor 220 to control the external apparatus 100.

In detail, if a touch input for controlling the external apparatus 100 is detected in the middle of controlling the external apparatus 100 using the sensing value of the motion detecting sensor 210, the controller 230 may control the external apparatus 100 depending on the detected touch input. In this case, the controller 230 may disregard the sensing value of the motion detecting sensor 210 and use only the sensing value of the touch sensor 220 to control the external apparatus 100.

Meanwhile, the controller 230 may compensate for the motion of the remote control apparatus 200 before the motion detecting sensor 210 is turned on based on a detected sensing value after a timing when the motion detecting sensor 210 is turned on and control the external apparatus 100 based on the compensated value.

That is, if a touch input is detected, the motion detecting sensor 210 is supplied with power and may require a predetermined time until it is supplied with power and then turned on. Therefore, the motion detecting sensor 210 may not detect the motion of the remote control apparatus 200 from the timing when the touch sensor detects the touch input to the timing when the motion detecting sensor 210 is turned on.

Therefore, the controller 230 may compensate for the motion of the remote control apparatus 200 until the motion detecting sensor 210 is turned on by using the detected sensing value after the timing when the motion detecting sensor 210 is turned on and transmit a signal corresponding to the compensated value to the external apparatus 100.

For example, assume that it takes time as much as a until the motion detecting sensor 210 is turned on and the sensing value detected by the motion detecting sensor 210 for time as much as b after the motion detecting sensor 210 is turned on is B.

In this case, the controller 230 may calculate, as A=B*a/b, a value corresponding to the motion for time a until the motion detecting sensor 210 is turned on and generate the signal corresponding to the overall motion of the remote control apparatus 200, that is, A+B, and transmit the generated signal to the external apparatus 100.

Therefore, even the motion of the remote control apparatus 200 until the motion detecting sensor 210 is turned on as well as after the motion detecting sensor 210 is turned on may be reflected in the control of the external apparatus 100.

Meanwhile, if the touch input is released, the controller 230 may stop driving of the motion detecting sensor 210.

In detail, if the corresponding touch input is released after a touch input for controlling the external apparatus 100 is input or a touch input independent of the control of the external apparatus 100 is input, the controller 230 may cut off the power supplied to the motion detecting sensor 210 to stop the driving of the motion detecting sensor 210.

As described above, the example embodiment of the present disclosure may selectively use the sensing value of the touch sensor 220 and the sensing value of the motion detecting sensor 210 according to whether the user intends to control the external apparatus 100 by touching the remote control apparatus 200 or control the external apparatus 100 based on the motion of the remote control apparatus 200, thereby controlling the external apparatus 100.

In particular, according to the example embodiment of the present disclosure, it is preferentially determined whether the detected touch input corresponds to a touch input for controlling the external apparatus 100 to determine whether to use the sensing value of the touch sensor 220 or the sensing value of the motion detecting sensor 210. As the determination result, if the detected touch input corresponds to a touch input for controlling the external apparatus 100, since the external apparatus 100 is controlled using only the sensing value of the touch sensor 220, it may be considered that the touch input has priority higher than that of the motion of the remote control apparatus 200.

Meanwhile, the foregoing example describes the priority for the touch input and the motion of the remote control apparatus 200, which is only an example.

That is, the remote control apparatus 200 may further include a button (that is, physical button) for controlling the external apparatus 100. In this case, when the user selects the button, the touch panel may be touched or the remote control apparatus 200 may also move.

In this case, if the button is selected, the controller 230 may determine that the user intends to preferentially control the external apparatus 100 using the button and may transmit only a signal corresponding to the selected button to the external apparatus 100. That is, if the button is selected, the controller 230 may disregard the sensing value of the touch sensor 220 and the sensing value of the motion detecting sensor 210 and consider the selection of the button as the highest priority.

For example, assume that the button for selecting the external input is selected, and at the same time the touch input is detected. In this case, the controller 230 may disregard the sensing value of the touch sensor 220 and generate a signal for changing an external input depending on the selected button and transmit the generated signal to the external apparatus 100 and the external apparatus 100 may perform an operation of converting an external input based on the received signal.

Further, the foregoing example describes that it is determined whether the detected touch input corresponds to a touch input for controlling the external apparatus 100, which is only an example. That is, the sensing value of the touch sensor 220 and the sensing value of the motion detecting sensor 210 may be selectively used according to whether the detected touch input corresponds to a touch input for controlling the remote control apparatus 200 itself.

For example, assume that the flick is a touch input for changing a screen (for example, home screen) displayed on the touch screen provided in the remote control apparatus 200.

In this case, if the flick is detected, the controller 230 may determine that the corresponding flick corresponds to the touch input for changing the screen displayed on the touch screen. Further, if an input other than the flick is detected, the controller 230 may determine that the input does not correspond to a touch input for controlling the remote control apparatus 200 itself.

Accordingly, if it is determined that the flick is detected, the controller 230 may move the screen displayed on the touch screen in the direction in which the flick is performed and gradually display a new screen on the touch screen from an opposite direction thereto. In this case, the controller 230 may use only the sensing value of the touch sensor 220 and the remote control apparatus 200 may move by the flick and thus the sensing value detected by the motion detecting sensor 210 may be disregarded.

As another example, assume that a tap for the item displayed on the touch screen is a tap for performing the function corresponding to the corresponding item. Here, the item may be an item for performing an application installed in the remote control apparatus 200.

In this case, if the tap for the application item displayed on the touch screen is detected, the controller 230 may perform the corresponding application and display an application execution screen on the touch screen. In this case, the controller 230 may use only the sensing value of the touch sensor 220 and the remote control apparatus 200 may move by the tap and this the sensing value detected by the motion detecting sensor 210 may be disregarded.

Figure 3:
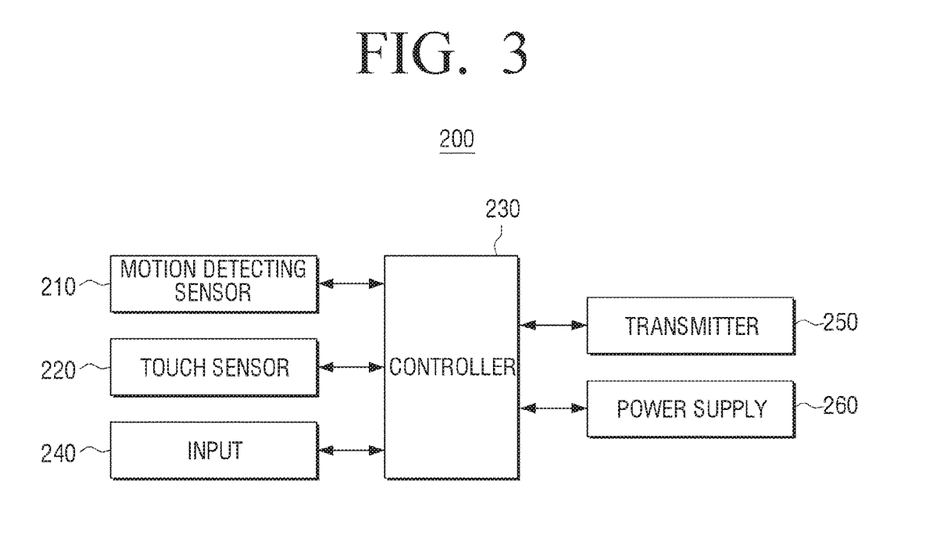
FIG. 3 is a block diagram for describing a detailed configuration of the remote control apparatus according to the example embodiment of the present disclosure.

FIG. 3 is a block diagram for describing a detailed configuration of the remote control apparatus according to the example embodiment of the present disclosure. The remote control apparatus 200 illustrated in FIG. 3 may include an input 240, a transmitter 250, and a power supply 260 in addition to the motion detecting sensor 210, the touch sensor 220, and the controller 230. Meanwhile, among the components illustrated in FIG. 3, a detailed description of the components illustrated in FIG. 2 will be omitted.

The input 240 receives various user instructions. In detail, the input 240 may receive various user commands for controlling the external apparatus 100 and transmit the received user commands to the controller 230.

For this purpose, the input 240 may be implemented as at least one physical button or may be implemented as a touch pad for receiving the user's touch input. Alternatively, the input 240 may be implemented as the touch screen to display various screens and receive the touch input based on the displayed screen.

The transmitter 250 transmits the signal for controlling the electronic apparatus 100 to the electronic apparatus 100. In detail, the transmitter 250 may use schemes such as IR, Bluetooth, and/or WiFi to transmit the signal corresponding to the user command input through the input 240 to the electronic apparatus 100.

For example, if a flick is input through the input 240, the controller 230 may control the transmitter 250 to transmit the signal corresponding to the direction in which the flick is performed to the electronic apparatus 100. Further, if a tap for the volume control item displayed on the touch screen is detected, the controller 230 may control the transmitter 250 to transmit the signal corresponding to the detected tap to the electronic apparatus 100.

The power supply 260 may be implemented as a battery, etc., to supply power to each component of the remote control apparatus 200.

In this case, the controller 230 may control the power supply 260 to selectively supply power to each component of the remote control apparatus 200.

In detail, if the touch input is detected in the state in which the power is supplied to the touch sensor 220 and the supply of power to the motion detecting sensor 210 is cut off, the controller 230 may control the power supply 260 to supply power to the motion detecting sensor 210. Further, if the touch is released, the controller 230 may control the power supply 260 to cut off power supplied to the motion detecting sensor 210.

FIGS. 4A-4C and 5A-5C are diagrams for describing a method for selectively applying power to a motion detecting sensor depending on a touch input according to an example embodiment of the present disclosure.

Figure 4A:
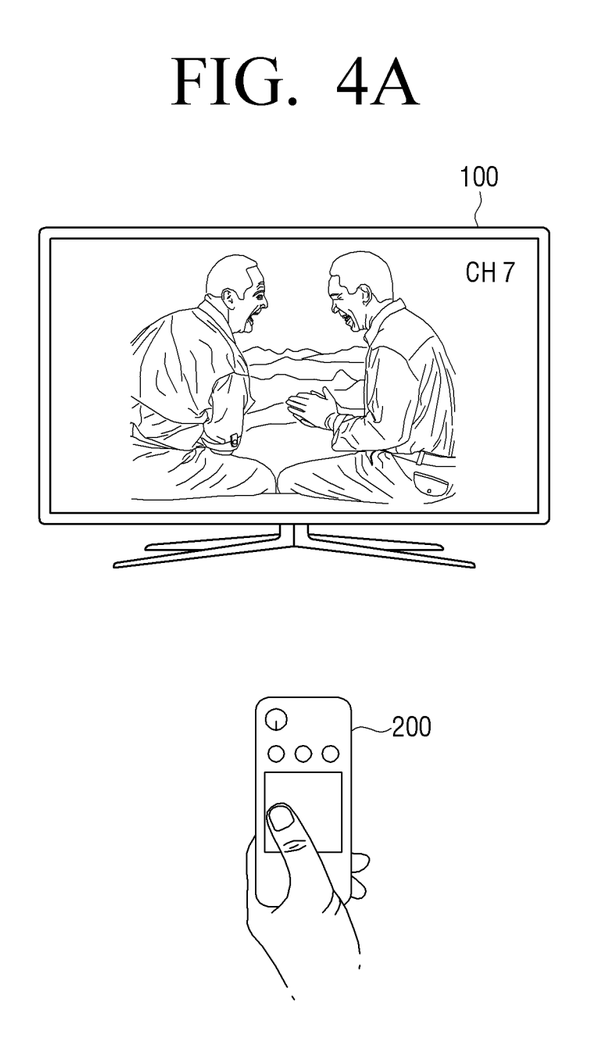
FIGS. 4A, 4B, and 4C and 5A, 5B and 5C are diagrams for describing a method for selectively using a sensing value of a touch sensor and a sensing value of a motion detecting sensor depending on a touch input according to an example embodiment of the present disclosure.
Figure 4B:
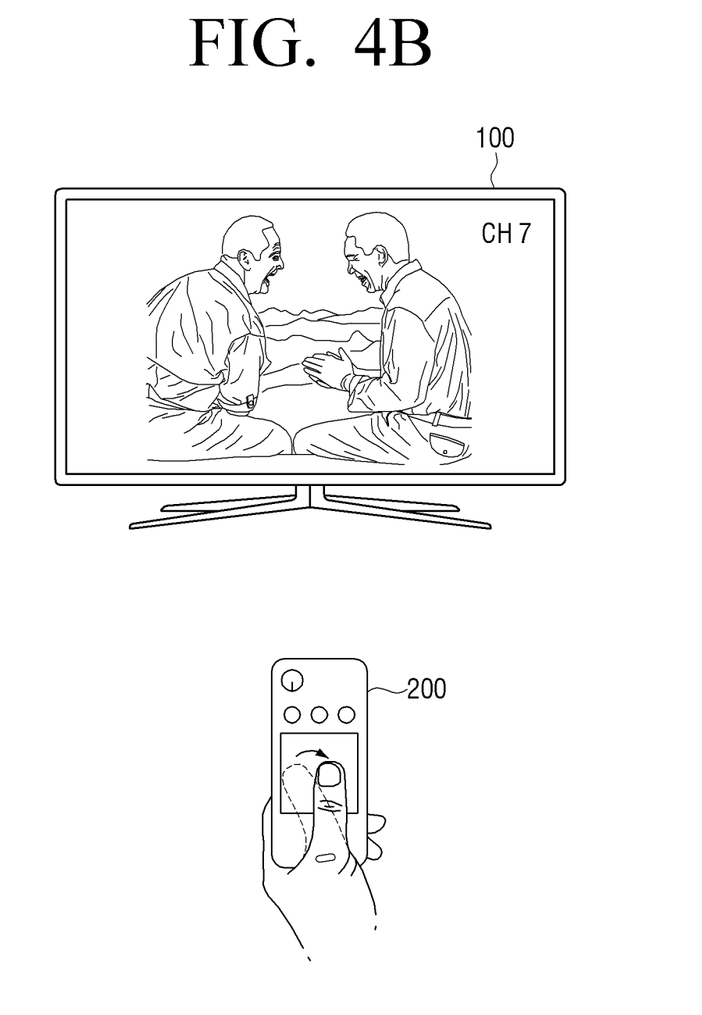
Figure 4C:
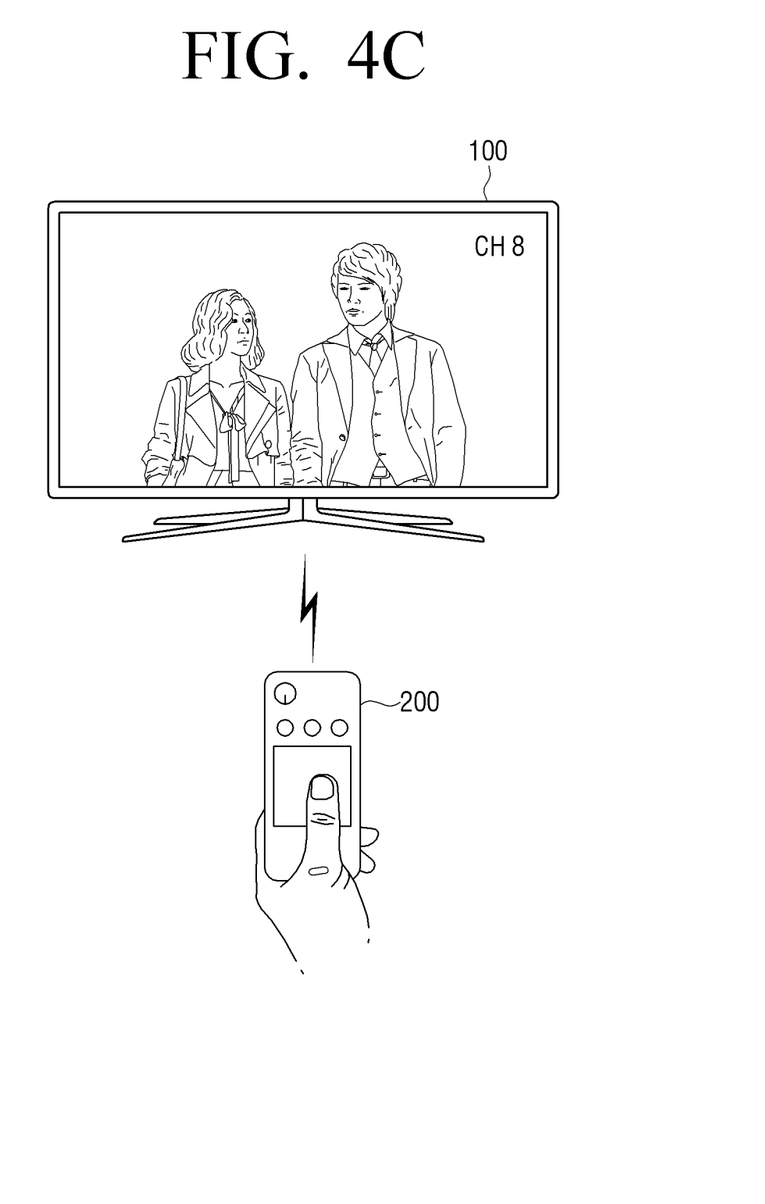

First, FIGS. 4A-4C are diagrams for describing a case in which the detected touch input corresponds to the touch input for controlling the external apparatus 100, according to the example embodiment of the present disclosure.

First, as illustrated in FIG. 4A, if the touch input of the user is detected, the remote control apparatus 200 may supply power to the motion detecting sensor to which power is not supplied and determine whether the touch input of the user corresponds to a touch input for controlling the external apparatus 100.

In this case, as illustrated in FIG. 4B, if it is determined that the flick in the right direction that is the touch input for changing the channel of the external apparatus 100 is input, the remote control apparatus 200 may determine that the corresponding touch input corresponds to the touch input for controlling the external apparatus 100.

In this case, the remote control apparatus 200 may use only the sensing value of the touch sensor to control the external apparatus 100. For example, as illustrated in FIG. 4C, the remote control apparatus 200 may transmit a signal corresponding to the flick in the right direction to the electronic apparatus 100 and the electronic apparatus 100 may select another channel depending on the signal received from the remote control apparatus 200 and output broadcasting provided by the corresponding channel.

In this case, the remote control apparatus 200 may disregard the sensing value of the motion detecting sensor. That is, even when the remote control apparatus 200 moves depending on the flick and thus the motion detecting sensor outputs a sensing value, the remote control apparatus 200 may disregard the sensing value of the motion detecting sensor to prevent the external apparatus 100 from being controlled according to the motion of the remote control apparatus 200.

Figure 5A:
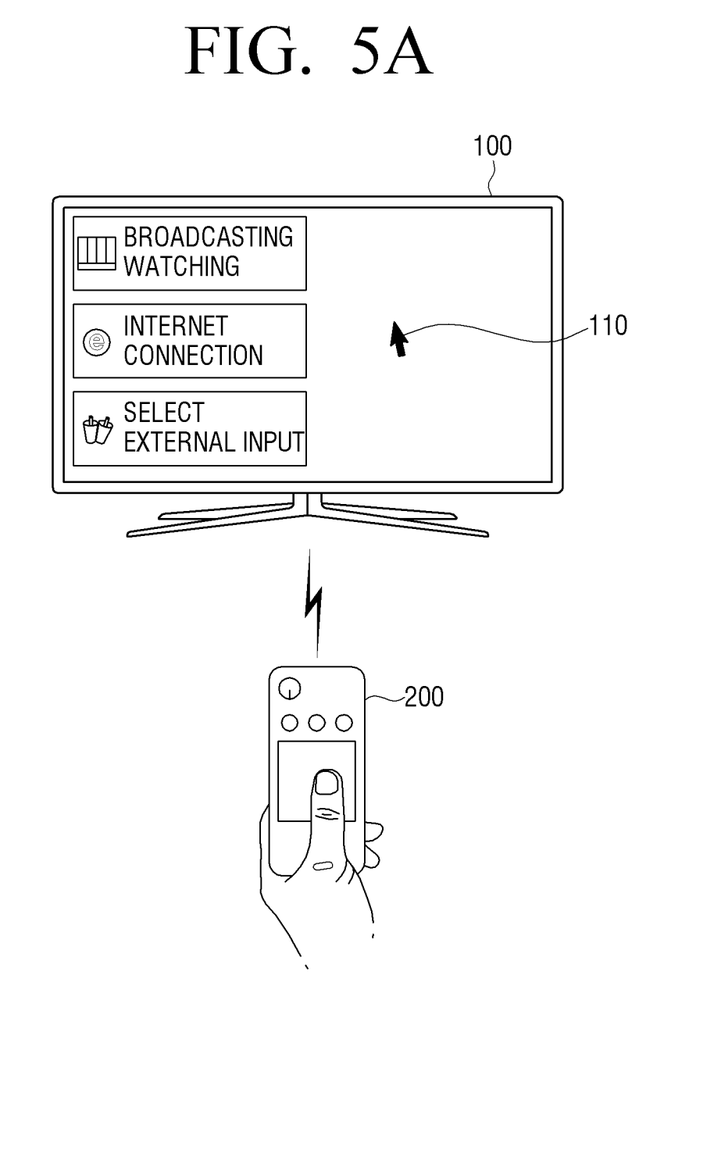
Figure 5B:
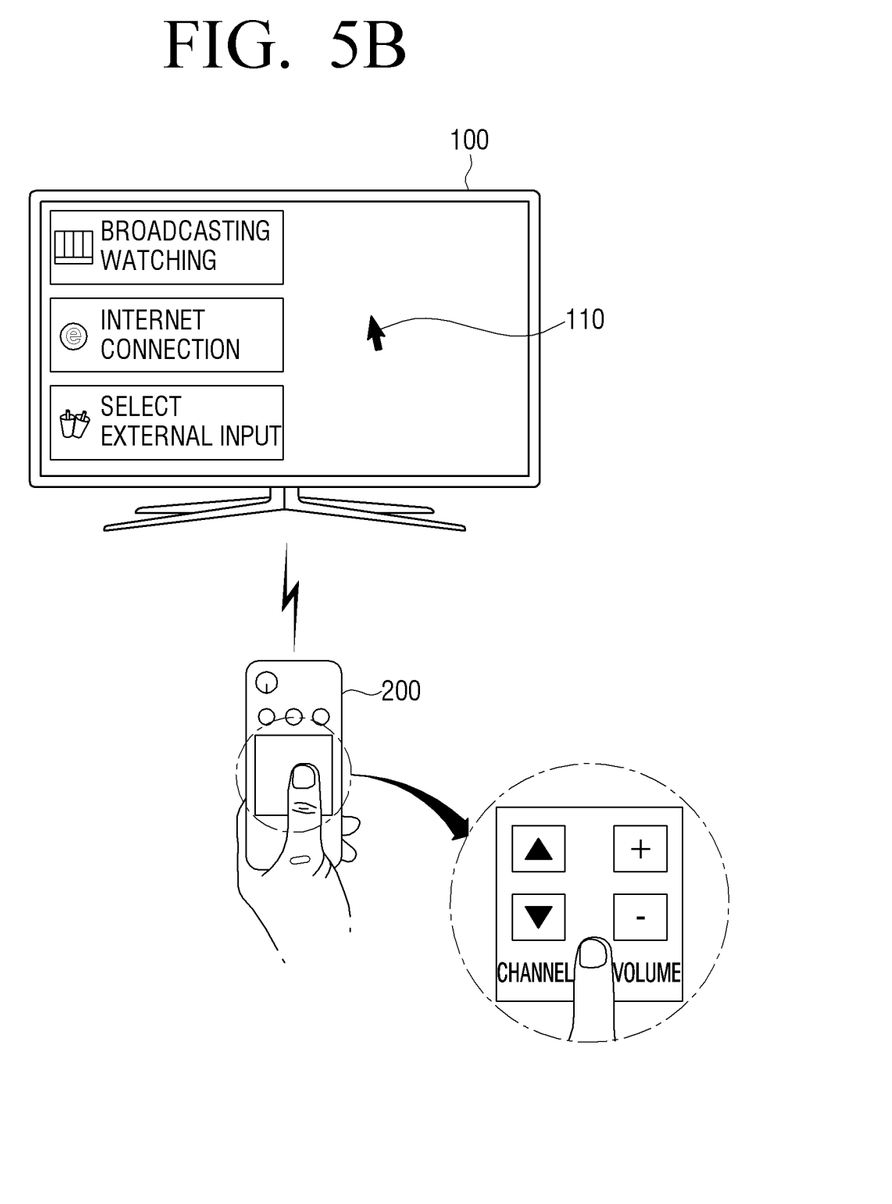
Figure 5C:
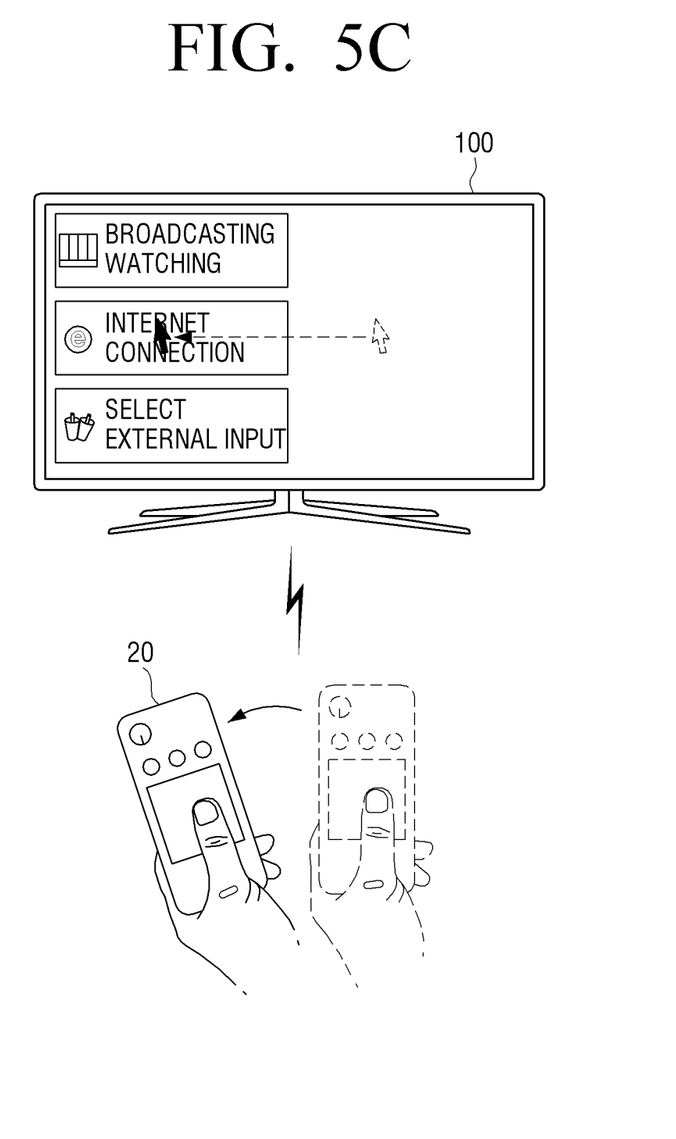

Meanwhile, FIGS. 5A-5C are diagrams for describing a case in which the detected touch input does not correspond to a touch input for controlling the external apparatus 100, according to the example embodiment of the present disclosure.

First, as illustrated in FIG. 5A, if the touch input of the user is detected, the remote control apparatus 200 may supply power to the motion detecting sensor to which power is not supplied and determine whether the touch input of the user corresponds to the touch input for controlling the external apparatus 100.

In this case, as illustrated in FIG. 5B, when the touch input is a tap for a region other than the channel change item and the volume control item displayed on the touch screen, the remote control apparatus 200 may determine that the corresponding touch input does not correspond to the touch input for controlling the external apparatus 100.

Further, the remote control apparatus 200 may determine whether the motion of the remote control apparatus 200 detected by the motion detecting sensor in the state in which the touch input is continuously maintained is a motion for controlling the external apparatus 100.

For example, as illustrated in FIG. 5C, if it is determined that the detected motion of the remote control apparatus 200 is a motion moved beyond a preset threshold distance in the left direction, the remote control apparatus 200 may determine that the detected motion corresponds to a motion for controlling the external apparatus 100.

In this case, the remote control apparatus 200 may use only the sensing value of the motion detecting sensor to control the external apparatus 100. For example, as illustrated in FIG. 5C, the remote control apparatus 200 may transmit a signal corresponding to the motion in the left direction to the electronic apparatus 100 and the electronic apparatus 100 may move the cursor displayed on the screen to the left based on the signal received from the remote control apparatus 200.

In this case, the remote control apparatus 200 may disregard the sensing value of the touch sensor. That is, as long as the detected touch input does not correspond to a touch input for controlling the external apparatus 100 even when the touch input is detected while the remote control apparatus 200 is moved to the left, the sensing value of the touch sensor is disregarded to prevent the external apparatus 100 from being controlled depending on the touch input.

However, if the touch input detected during the movement of the remote control apparatus 200 to the left corresponds to a touch input for controlling the external apparatus 100, the remote control apparatus 200 may disregard the sensing value of the motion detecting sensor and use the sensing value of the touch sensor to control the external apparatus 100.

For example, if the flick in the right direction is detected while the remote control apparatus 200 is moved to the left, the remote control apparatus 200 may disregard the sensing value of the motion detecting sensor and generate the signal corresponding to the flick in the right direction and transmit the generated signal to the electronic apparatus 100. In this case, the electronic apparatus 100 may stop the movement of the cursor and select another channel depending on the signal received from the remote control apparatus 200.

Figure 6:
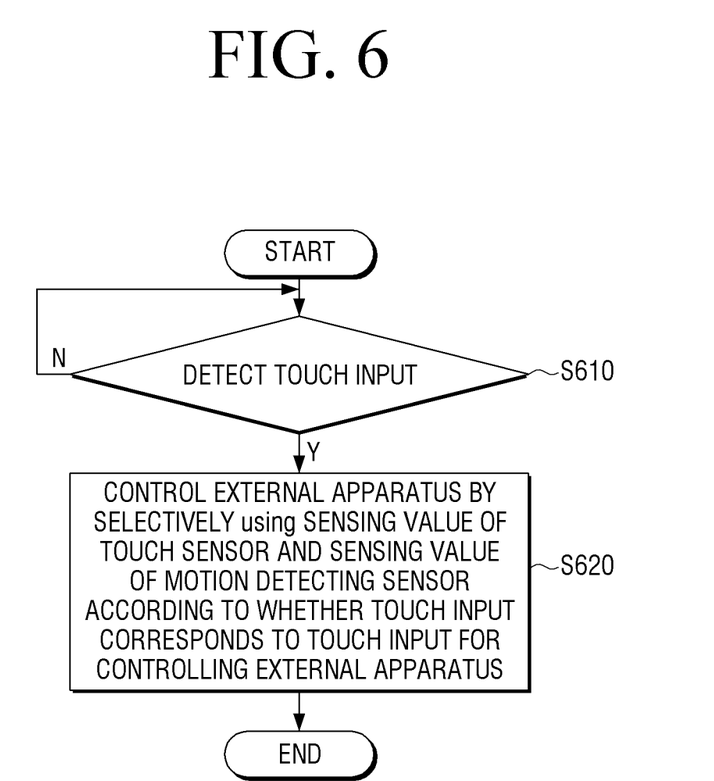
FIG. 6 is a flow chart for describing a control method for a remote control apparatus according to an example embodiment of the present disclosure.

FIG. 6 is a flow chart for describing a control method for a remote control apparatus according to an example embodiment of the present disclosure. In this case, the remote control apparatus may include the touch sensor and the motion detecting sensor, in which the motion detecting sensor may be implemented as a 6-axis sensor.

First, the touch input is received (S610).

Next, the external apparatus is controlled by selectively using the sensing value of the touch sensor and the sensing value of the motion detecting sensor according to whether the touch input corresponds to a touch input for controlling the external apparatus (S620).

In this case, in step S620, when the touch input is detected, the motion detecting sensor that is turned off may be turned on.

Further, in step S620, if the touch input corresponds to a touch input for controlling the external apparatus, the external apparatus may be controlled by using the sensing value of the touch sensor.

Further, in step S620, if the touch input does not correspond to a touch input for controlling the external apparatus, the external apparatus may be controlled by using the sensing value of the motion detecting sensor. In this case, in step S620, the motion of the remote control apparatus may be compensated before the motion detecting sensor is turned on based on the detected sensing value after the timing when the motion detecting sensor is turned on and the external apparatus may be controlled based on the compensated value.

Meanwhile, in step 620, if a touch input for controlling the external apparatus is detected in the state in which the sensing value of the motion detecting sensor is used to control the external apparatus, the external apparatus may be controlled by the sensing value of the touch sensor.

Meanwhile, the method for selectively using the sensing value of the touch sensor and the sensing value of the motion detecting sensor was described in detail.

Meanwhile, a non-transitory computer readable medium in which a program sequentially performing the controlling method according to the present disclosure is stored may be provided.

The non-transitory computer readable medium includes a medium that at least semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

In addition, although buses are not illustrated in the block diagrams illustrating the remote control apparatus, communication between the respective components in the display apparatus may be performed through the buses. In addition, the remote control apparatus may further include hardware processors such as a CPU and a microprocessor and/or other circuitry which execute various processes described above.

Although example embodiments of the present disclosure have been illustrated and described hereinabove, the present disclosure is not limited to the above-mentioned specific example embodiments, but may be variously modified by those skilled in the art to which the present disclosure pertains without departing from the scope and spirit of the disclosure as disclosed in the accompanying claims. These modifications should also be understood to fall within the scope of the present disclosure.

The invention claimed is:

1. A remote control apparatus for controlling an external apparatus, comprising:
   a motion detecting sensor configured to detect aspects of motion of the remote control apparatus;
   a touch sensor configured to detect a touch input to the remote control apparatus; and
   a controller configured to:
      based on the touch input being detected by the touch sensor, turn on the motion detecting sensor;
      based on identifying that the detected touch input corresponds to a command for controlling the external apparatus, control the external apparatus using the detected touch input; and
      based on identifying that the detected touch input does not correspond to a command for controlling the external apparatus, obtain a first sensing value of the motion detecting sensor after the motion detecting sensor is turned on, obtain, based on the first sensing value, a compensating second sensing value of the motion detecting sensor representing motion of the remote control apparatus before the motion detecting sensor is turned on, and control the external apparatus using the first sensing value and the compensating second sensing value.

2. The remote control apparatus as claimed in claim 1, wherein the controller is configured to, when a touch input corresponding to a command for controlling the external apparatus is detected in a state in which a sensing value of the motion detecting sensor is used to control the external apparatus, control the external apparatus by using a sensing value of the touch sensor.

3. The remote control apparatus as claimed in claim 1, wherein the motion detecting sensor comprises a 6-axis sensor.

4. A control method for a remote control apparatus to control an external apparatus, the remote control apparatus including a motion detecting sensor configured to detect aspects of motion of the remote control apparatus and a touch sensor configured to detect a touch input to the remote control apparatus, the method comprising:
   detecting a touch input;
   based on the touch input being detected by the touch sensor, turning on the motion detecting sensor;
   based on identifying that the detected touch input corresponds to a command for controlling the external apparatus, controlling the external apparatus using the detected touch input; and
   based on identifying that the detected touch input does not correspond to a command for controlling the external apparatus, obtaining a first sensing value of the motion detecting sensor after the motion detecting sensor is turned on, obtaining, based on the first sensing value, a compensating second sensing value of the motion detecting sensor representing motion of the remote control apparatus before the motion detecting sensor is turned on, and controlling the external apparatus using the first sensing value and the compensating second sensing value.

5. The method as claimed in claim 4, further comprising, when the touch input is detected, turning on the motion detecting sensor if the motion detecting sensor is turned off.

6. The method as claimed in claim 4, further comprising, when a touch input corresponding to a command for controlling the external apparatus is detected in a state in which a sensing value of the motion detecting sensor is used to control the external apparatus, controlling the external apparatus based on a sensing value of the touch sensor.

7. The method as claimed in claim 4, wherein the motion detecting sensor comprises a 6-axis sensor.

8. The remote control apparatus as claimed in claim 1, wherein the control of the external apparatus using the first sensing value and the compensating second sensing value is further based on the touch sensor continuing to detect the touch input.

9. The remote control apparatus as claimed in claim 1, wherein the controller is configured to:
   when the touch input is detected, turn on the motion detecting sensor, if the motion detecting sensor is turned off at a time the touch input is detected, and
   wherein the controlling of the external apparatus using the first sensing value and the compensating second sensing value is further based on the touch sensor continuing to detect the touch input.

10. The method as claimed in claim 4, wherein the controlling of the external apparatus using the first sensing value and the compensating second sensing value is further based on the touch sensor continuing to detect the touch input.

11. The method as claimed in claim 4, further comprising:
   when the touch input is detected, turning on the motion detecting sensor, if the motion detecting sensor is turned off at a time the touch input is detected, and
   wherein the controlling of the external apparatus using the first sensing value and the compensating second sensing value is further based on the touch sensor continuing to detect the touch input.

* * * * *